US011042722B2

(12) United States Patent
Cao (10) Patent No.: US 11,042,722 B2
(45) Date of Patent: Jun. 22, 2021

(54) ARTIFICIAL NEURAL NETWORK

(71) Applicant: NOKIA TECHNOLOGIES OY, Espoo (FI)

(72) Inventor: Jiale Cao, Tianjin (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 118 days.

(21) Appl. No.: 16/474,368

(22) PCT Filed: Dec. 30, 2016

(86) PCT No.: PCT/CN2016/113429
§ 371 (c)(1),
(2) Date: Jun. 27, 2019

(87) PCT Pub. No.: WO2018/120000
PCT Pub. Date: Jul. 5, 2018

(65) Prior Publication Data
US 2019/0340416 A1 Nov. 7, 2019

(51) Int. Cl.
*G06K 9/62* (2006.01)
*G06K 9/00* (2006.01)
*G06F 17/15* (2006.01)
*G06N 3/04* (2006.01)

(52) U.S. Cl.
CPC ......... *G06K 9/00201* (2013.01); *G06F 17/15* (2013.01); *G06K 9/6267* (2013.01); *G06N 3/04* (2013.01)

(58) Field of Classification Search
CPC ........ G06K 9/6257; G06T 2207/20084; G06T 2207/20081; G06N 3/02–3/105
See application file for complete search history.

(56) References Cited

U.S. PATENT DOCUMENTS

2015/0146915 A1* 5/2015 Peng .................. G06K 9/00986
382/103

FOREIGN PATENT DOCUMENTS

| CN | 104200269 A | 12/2014 |
|---|---|---|
| CN | 104732303 A | 6/2015 |
| CN | 104767449 A | 7/2015 |

(Continued)

OTHER PUBLICATIONS

International Search Report and Written Opinion dated Oct. 11, 2017 corresponding to International Patent Application No. PCT/CN2016/113429.

(Continued)

*Primary Examiner* — Brian Werner
(74) *Attorney, Agent, or Firm* — Squire Patton Boggs (US) LLP (57) ABSTRACT

An apparatus comprises memory configured to store, at least partly, labelling information of a convolutional artificial neural network, and at least one processing core configured to generate, from an input data item, partial feature maps of the convolutional artificial neural network in accordance with the labelling information, generate, from the partial feature maps, inputs to a plurality of weak classifiers to generate a classification decision, wherein the labelling information identifies at least one of the following: elements of the feature maps that generate the inputs, and elements of the feature maps that are used to generate the elements that generate the inputs.

20 Claims, 5 Drawing Sheets (56) References Cited

FOREIGN PATENT DOCUMENTS

| CN | 105528638 A | 4/2016 |
|----|-------------|--------|
| EP | 3065085 A1 | 9/2016 |
| WO | 2016095117 A1 | 6/2016 |

OTHER PUBLICATIONS

Jul. 8, 2020 Extended Search Report issued in European Patent Application No. 16925674.0.
Jiale Cao et al.: "Learning Multilayer Channel Features for Pedestrian Detection", IEEE Transactions on Image Processing., vol. 26, No. 7, Mar. 1, 2016, pp. 3210-3220.
George D. C. Cavalcanti et al.: "MLPBoost: A combined AdaBoost / multi-layer perception network approach for face detection", 2012 IEEE International Conference on Systems, Man, and Cybernetics (SMC), Oct. 1, 2012, pp. 2350-2353.

\* cited by examiner

ARTIFICIAL NEURAL NETWORK

FIELD

The present invention relates to artificial neural networks, such as, for example, convolutional artificial neural networks.

BACKGROUND

Machine learning and machine recognition finds several applications, such as, for example, automated passport control at airports, where a digital image of a person's face may be compared to biometric information, stored in a passport, characterizing the person's face.

Another example of machine recognition is in handwriting or printed document text recognition, to render contents of books searchable, for example. A yet further example is pedestrian recognition, wherein, ultimately, a self-driving car is thereby seen as being enabled to become aware a pedestrian is ahead and the car can avoid running over the pedestrian.

In addition to visual recognition, spoken language may be the subject of machine recognition. When spoken language is recognized, it may be subsequently input to a parser to provide commands to a digital personal assistant, or it may be provided to a machine translation program to thereby obtain a text in another language, corresponding in meaning to the spoken language.

Machine recognition technologies employ algorithms engineered for this purpose. For example, artificial neural networks may be used to implement machine vision applications. Artificial neural network may be referred to herein simply as neural networks. Machine recognition algorithms may comprise processing functions, in recognition of images such processing functions may include, for example, filtering, such as morphological filtering, thresholding, edge detection, pattern recognition and object dimension measurement.

Neural network may be comprise, for example, fully connected layers and convolutional layers. A fully connected layer may comprise a layer wherein all neurons have connections to all neurons on an adjacent layer, such as, for example, a previous layer. A convolutional layer may comprise a layer wherein neurons receive input from a part of a previous layer, such part being referred to as a receptive field, for example.

The larger the number of layers, the larger is the compuatational load associated with running an artificial neural network.

SUMMARY OF THE INVENTION

The invention is defined by the features of the independent claims. Some specific embodiments are defined in the dependent claims.

According to a first aspect of the present invention, there is provided an apparatus comprising memory configured to store, at least partly, labelling information of a convolutional artificial neural network, and at least one processing core configured to generate, from an input data item, partial feature maps of the convolutional artificial neural network in accordance with the labelling information, generate, from the partial feature maps, inputs to a plurality of weak classifiers to generate a classification decision, wherein the labelling information identifies at least one of the following: elements of the feature maps that generate the inputs, and elements of the feature maps that are used to generate the elements that generate the inputs.

Various embodiments of the first aspect may comprise at least one feature from the following bulleted list:

- the apparatus is configured to generate, in generating the partial feature maps, feature map elements identified by the labelling information and leave un-generated at least part of the feature map elements not identified by the labelling information
- the apparatus is configured to generate, in generating the partial feature maps, feature map elements identified by the labelling information and leave un-generated all of the feature map elements not identified by the labelling information
- the apparatus is configured to leave un-generated, in generating the partial feature maps, feature maps that do not comprise any elements identified by the labelling information
- the input data item comprises at least one of an image, a video frame and an audio clip
- the apparatus is configured to stop analysing the input data item responsive to the classification decision being taken by the plurality of weak classifiers based on partial generation of the partial feature maps
- the apparatus is configured to generate a default classification decision responsive to the weak classifiers not reaching the classification decision based on the partial feature maps
- the default classification decision comprises that an object is detected in the input data item
- the convolutional artificial neural network comprises 19 layers
- the convolutional artificial neural network is configured to use an entire input data item, the input data item comprising an image.

According to a second aspect of the present invention, there is provided a method comprising storing, at least partly, labelling information of a convolutional artificial neural network, generating, from an input data item, partial feature maps of the convolutional artificial neural network in accordance with the labelling information, generating, from the partial feature maps, inputs to a plurality of weak classifiers to generate a classification decision, wherein the labelling information identifies at least one of the following: elements of the feature maps that generate the inputs, and elements of the feature maps that are used to generate the elements that generate the inputs.

Various embodiments of the second aspect may comprise at least one feature from the following bulleted list:

- the method comprises generating, in generating the partial feature maps, feature map elements identified by the labelling information and leaving un-generated at least part of the feature map elements not identified by the labelling information
- the method comprises generating, in generating the partial feature maps, feature map elements identified by the labelling information and leaving un-generated all of the feature map elements not identified by the labelling information
- the method comprises leaving un-generated, in generating the partial feature maps, feature maps that do not comprise any elements identified by the labelling information
- the input data item comprises at least one of an image, a video frame and an audio clip
- the method comprises stopping analysing the input data item responsive to the classification decision being taken by the plurality of weak classifiers based on partial generation of the partial feature maps the method comprises generating a default classification decision responsive to the weak classifiers not reaching the classification decision based on the partial feature maps the default classification decision comprises that an object is detected in the input data item the convolutional artificial neural network comprises 19 layers the convolutional artificial neural network is configured to use an entire input data item, the input data item comprising an image.

According to a third aspect of the present invention, there is provided an apparatus comprising means for storing, at least partly, labelling information of a convolutional artificial neural network, means for generating, from an input data item, partial feature maps of the convolutional artificial neural network in accordance with the labelling information, means for generating, from the partial feature maps, inputs to a plurality of weak classifiers to generate a classification decision, wherein the labelling information identifies at least one of the following: elements of the feature maps that generate the inputs, and elements of the feature maps that are used to generate the elements that generate the inputs.

According to a fourth aspect of the present invention, there is provided a non-transitory computer readable medium having stored thereon a set of computer readable instructions that, when executed by at least one processor, cause an apparatus to at least store, at least partly, labelling information of a convolutional artificial neural network, generate, from an input data item, partial feature maps of the convolutional artificial neural network in accordance with the labelling information, generate, from the partial feature maps, inputs to a plurality of weak classifiers to generate a classification decision, wherein the labelling information identifies at least one of the following: elements of the feature maps that generate the inputs, and elements of the feature maps that are used to generate the elements that generate the inputs.

According to a fifth aspect of the present invention, there is provided a computer program configured to cause a method in accordance with the second aspect to be performed.

EMBODIMENTS

The computational load of running a convolutional neural network, CNN, especially one with a large number of layers, may be controlled by calculating only partial feature maps of the neural network. To accomplish this while maintaining the detection capability of the neural network, such elements of feature maps may be disregarded that do not, directly or indirectly, contribute to a classifying decision. To facilitate this, elements of feature maps may be labelled to enable generation of labelled elements, which contribute to a decision, and leaving un-generated elements that do not contribute to a decision concerning an input data item, such as, for example, and image.

Figure 1:
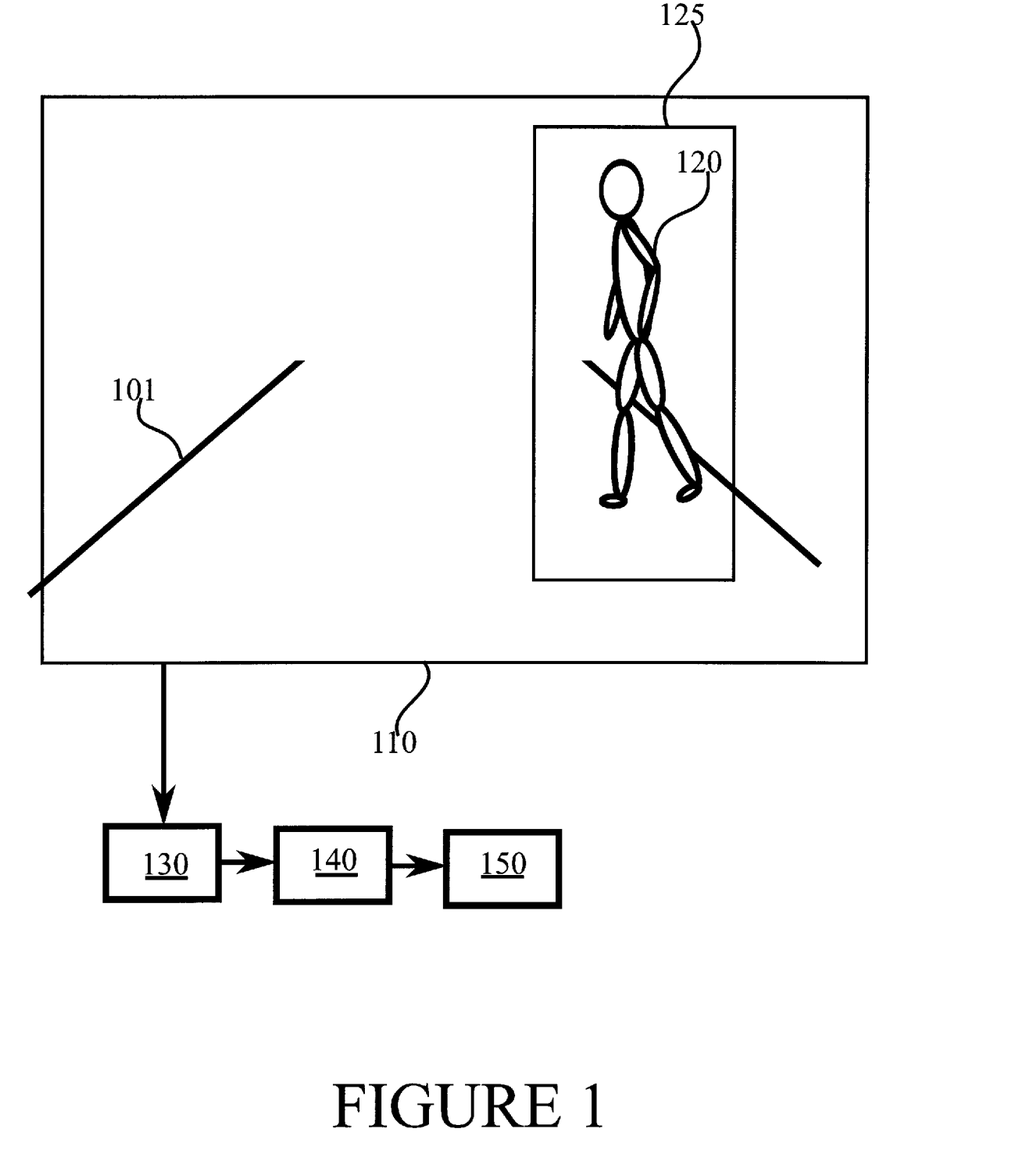
FIG. 1 illustrates an example system capable of supporting at least some embodiments of the present invention.

FIG. 1 illustrates an example system capable of supporting at least some embodiments of the present invention. FIG. 1 has a view 110 of a road 101, on which a pedestrian 120 is walking. While described herein in connection with FIG. 1 in terms of detecting pedestrians, the invention is not restricted thereto, but as the skilled person will understand, the invention is applicable also more generally to machine recognition in visual, audio or other kind of data, or indeed more generally to operating artificial neural networks. For example, bicyclist recognition, handwriting recognition, facial recognition, traffic sign recognition, voice recognition, language recognition, sign language recognition and/or spam email recognition may benefit from the present invention, depending on the embodiment in question.

In FIG. 1, road 101 is imaged by a camera. The camera may be configured to capture a view 110 that covers the road, at least in part. The camera may be configured to pre-process image data obtained from an image capture device, such as a charge-coupled device, CCD, comprised in the camera. Examples of pre-processing include reduction to black and white, contrast adjustment and/or brightness balancing to increase a dynamic range present in the captured image. In some embodiments, the image data is also scaled to a bit depth suitable for feeding into an image recognition algorithm, such as AdaBoost, for example. Pre-processing may include selection of an area of interest, such as area 125, for example, for feeding into the image recognition algorithm. Pre-processing may be absent or limited in nature, depending on the embodiment. The camera may be installed, for example, in a car that is configured to drive itself, or collect training data. Alternatively, the camera may be installed in a car designed to be driven by a human driver, but to provide a warning and/or automatic braking if the car appears to be about to hit a pedestrian or an animal.

An image feed from the camera may be used to generate a test dataset for use in training a neural network. Such a dataset may comprise training samples. A training sample may comprise a still image, such as a video image frame, or a short video clip, for example. Where the incoming data to be recognized is not visual data, the incoming data may comprise, for example, a vector of digital samples obtained from an analogue-to-digital converter. The analogue-to-digital converter may obtain an analogue feed from a microphone, for example, and generate the samples from the analogue feed. Overall, as discussed above, data of non-visual forms may also be the subject of machine recognition. For example, accelerometer or rotation sensor data may be used to detect whether a person is walking, running or falling. As a neural network may be trained to recognize objects in view 110, a training phase may precede a use phase, or test phase, of the neural network.

To control a computational load of using a neural network, partial feature maps of the neural network may be used to form weak classifiers, for example using cascade AdaBoost. Owing to the cascade property of cascade AdaBoost, some feature maps of the neural network are used in forming weak classifiers. In case a weak classifier gives a decision that an input does not comprise an object, the input is rejected and computation is stopped. Else, if the weak classifier cannot reject the input, computation continues. In case a final weak classifier cannot reject the input, the input may be considered to comprise an object, in other words, a classification decision that an object is detected may be reached.

When partial feature maps are used to form weak classifiers, some feature maps may, in forming the weak classifiers, be left without inputs to the weak classifiers. In other words, some feature maps do not affect the functioning of the weak classifiers at all. Such feature maps may be left un-generated in their totality, to conserve computation resources.

Likewise, when partial feature maps are used to form weak classifiers, some feature map elements of feature maps that do provide inputs to the weak classifiers may, in practice, not affect the functioning of the weak classifiers. A feature map may comprise a plurality of elements, for example a feature map of dimension 128×128 elements comprises 16384 elements. In principle, only a handful of these may provide input to a classifier, wherefore the classifier may be fed inputs by calculating only the handful of the elements that are needed to provide the inputs. For example, three elements out of 16384 may be needed, wherefore the other 16381 elements may be left un-generated unless they are needed to feed inputs to another classifier. The elements that provide input to at least one classifier, such as, for example, a weak classifier, are herein referred to as selected elements, which are identified in labelling information.

To further conserve computational resources, feature maps that precede, in the neural network, a feature map that feeds input to a classifier may also be partially generated. In detail, elements of such preceding feature maps may be generated to the extent they are needed to generate the subsequent-layer selected elements. Elements of such preceding feature maps that affect generation of the selected elements may be identified in the labelling information as well. In other words, elements in a receptive field of a selected element may be identified in the labelling information.

Overall, proceeding from a last layer to the first layer of the convolutional neural network, selected elements may be identified in the labelling information, elements in receptive fields of the selected elements may be identified in the labelling information, and further, elements in receptive fields of elements identified in the labelling information may be identified in the labelling information. Thus as a result, the labelling information may identify exactly those elements, that are needed to be generated to provide, via the selected elements, the inputs to the classifiers. The labelling information may identify directly these elements, or, in some embodiments, the labelling information may identify directly elements that may be left un-generated. In either case, the labelling information, directly or indirectly, indicates the elements needs to generate the inputs to the classifiers. When the elements are indirectly identified, they are the complement of elements directly identified.

Where plural weak classifiers are used, plural selected elements feeding inputs to these weak classifiers are present. The labelling information will thus enable the identification of the elements throughout the feature maps of the neural network, which need to be generated in order to provide inputs to the weak classifiers. Some elements may be needed in terms of generating input to more than one weak classifier, for example in early layers of the neural network, while many elements may remain un-identified in the labelling information. Such un-identified elements may be left ungenerated throughout the neural network, to conserve computational resources.

For example, where a layer i is preceeded by layer i−1, and a kernel of size 3×3 is employed in generating layer i from layer i−1, then for a selected element on layer i, nine elements in layer i−1 may be generated. Even further, in layer i−2, assuming the kernel size is also 3×3 in generating layer i−1 from layer i−2, 25 elements may be generated to enable generating the nine elements in layer i−1, which nine elements then enable the generation of the selected element in layer i.

The neural network is illustrated schematically in FIG. 1 as first layer 130, second layer 140 and third layer 150. An actual network may comprise more than three layers. Elements of feature maps of each layer may be divided into elements identified in the labelling information and elements not so identified, and computational resources may be conserved by generating only elements identified in the labelling information.

Figure 2:
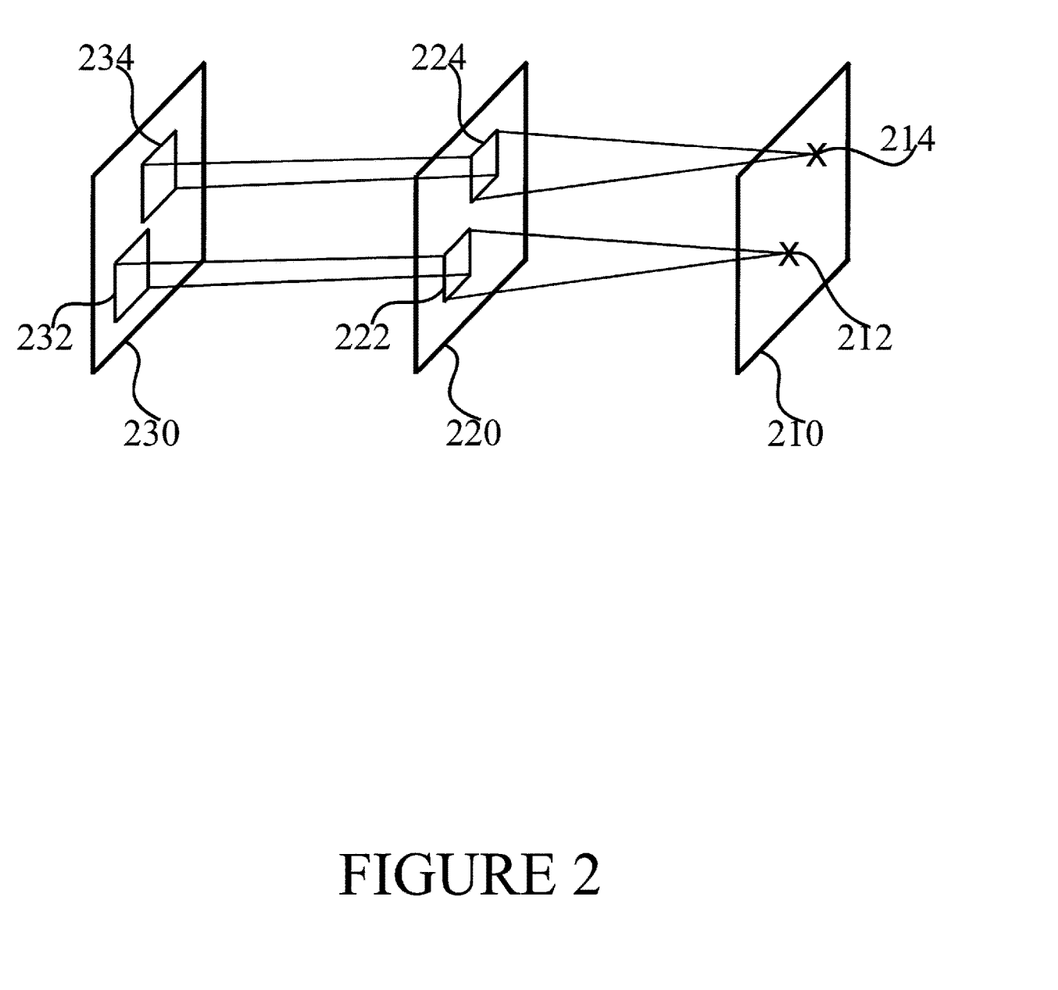
FIG. 2 illustrates layers in accordance with at least some embodiments of the present invention.

FIG. 2 illustrates layers in accordance with at least some embodiments of the present invention. Layer 210 is preceeded by layer 220, which is, in turn, preceeded by layer 230 in a neural network.

In a feature map of layer 210 are comprised elements 212 and 214, which provide inputs to weak classifiers. As described above, such elements are referred to herein as selected elements. The elements are denoted in the feature map illustrated in FIG. 2 with marks "x".

Receptive field 222 in layer 220 is used to generate selected element 212 in layer 210. The size of receptive field 222 depends on the kernel, also known as filter, used in producing the feature map or feature maps of layer 210 from layer 220. Similarly, receptive field 224 in layer 220 is used to generate selected element 214 in layer 210.

Further, field 232 in layer 230 is used to generate receptive field 222 in layer 220. Similarly, field 234 in layer 230 is used to generate receptive field 224 in layer 220. In general, fields contributing to a selected element may become gradually larger toward the beginning of the neural networks, since the receptive fields of elements at the edge of a field in a subsequent layer may extend in each direction. As such, fields 232 and 234 are drawn slightly larger than fields 222 and 224 in FIG. 2.

To generate the labelling information for the neural network illustrated in FIG. 2, one may begin with identifying in the labelling information selected elements 212 and 214, then adding the respective receptive fields 222 and 224 in layer 220, and finally fields 232 and 234 in layer, as they contribute to fields 222 and 224, and thereby to selected elements 212 and 214. By adding a field to the labelling information it is meant, that elements comprised in the field are identified in the labelling information.

In some embodiments, the labelling information identifies only the selected elements that provide inputs to classifiers, while in other embodiments both the selected elements that provide inputs to classifiers, as well as elements comprised directly or indirectly in receptive fields of the selected elements are identified in the labelling information.

In use, elements identified in the labelling information may be generated and elements not identified in the labelling information may be left un-generated. Since the contributing fields grow toward the left-hand-side of FIG. 2, that, is, toward the earlier layers of the neural network, the savings in computational capacity may become more pronounced toward the later layers of the neural network, since there a smaller proportion of elements comprised in the feature maps are identified in the labelling information.

In general a layer of a neural network may have more than one feature map, although the layers 210, 220 and 230 are illustrated in FIG. 2 as having one feature map, for the sake of simplicity.

Figure 3:
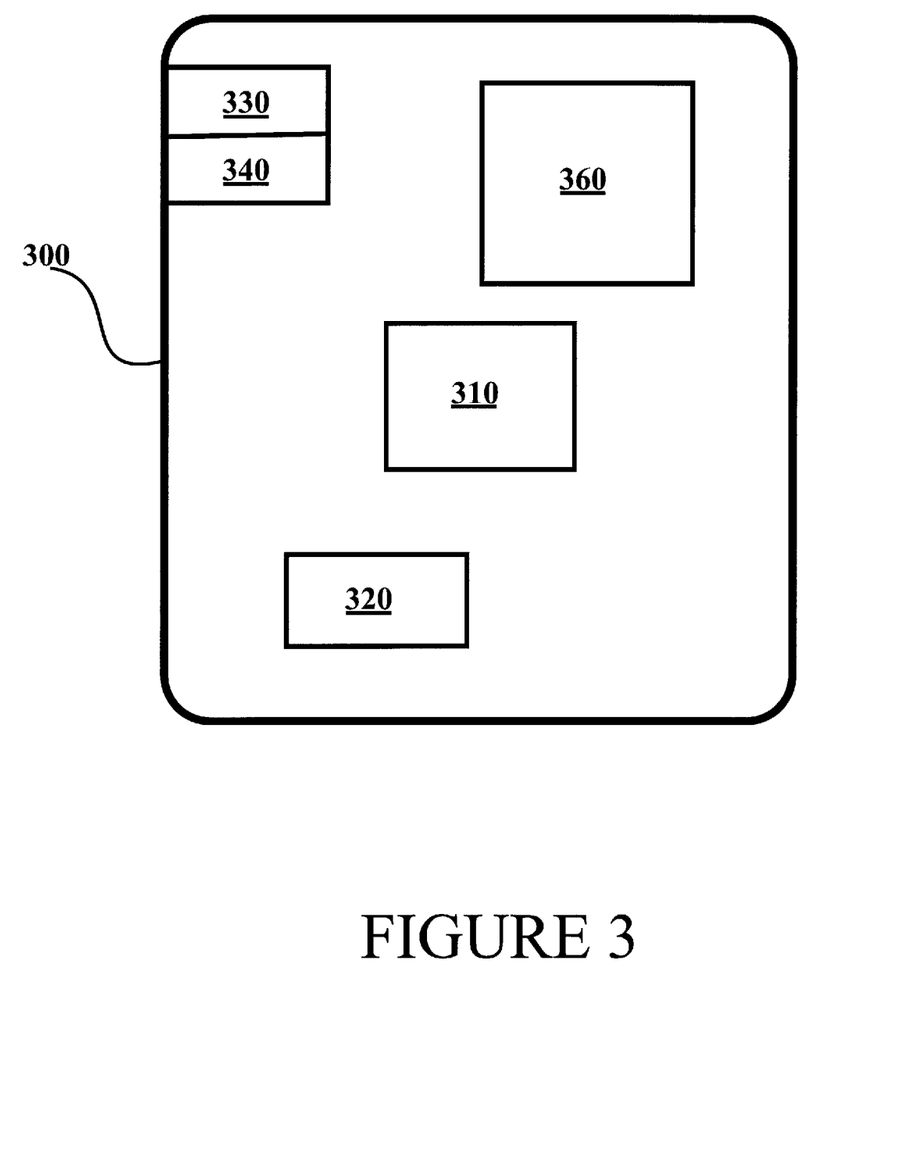
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, computing device such a server, node or cloud computing device. Device 300 may be configured to run a neural network, such as is described herein. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core by ARM Holdings or a Steamroller processing core produced by Advanced Micro Devices Corporation. Processor 310 may comprise at least one Qualcomm Snapdragon and/or Intel Core processor, for example. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Computer instructions in memory 320 may comprise a plurality of applications or processes. For example, machine learning algorithms, such as an AdaBoost algorithm with its classifiers, may run in one application or process, a camera functionality may run in another application or process, and an output of a machine learning procedure may be provided to a further application or process, which may comprise an automobile driving process, for example, to cause a braking action to be triggered responsive to recognition of a pedestrian in a camera view.

Device 300 may comprise a transmitter 330. Device 300 may comprise a receiver 340. Transmitter 330 and receiver 340 may be configured to transmit and receive, respectively, information in accordance with at least one communication standard. Transmitter 330 may comprise more than one transmitter. Receiver 340 may comprise more than one receiver. Transmitter 330 and/or receiver 340 may be configured to operate in accordance with wireless local area network, WLAN, Ethernet, universal serial bus, USB, and/or worldwide interoperability for microwave access, WiMAX, standards, for example. Alternatively or additionally, a proprietary communication framework may be utilized.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure machine learning parameters and/or to switch device 300 on and/or off.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above.

Processor 310, memory 320, transmitter 330, receiver 340, and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
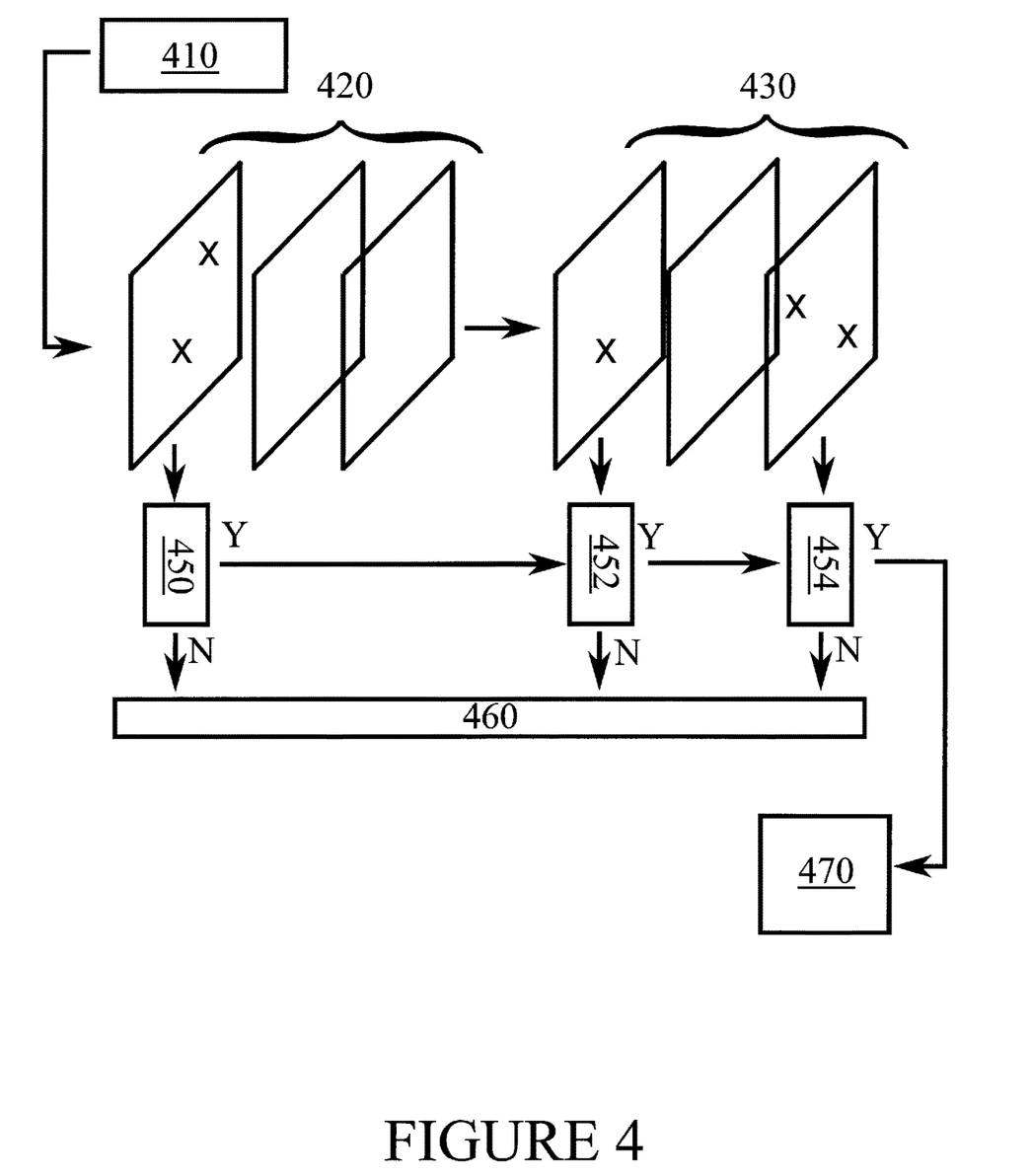
FIG. 4 illustrates a neural network in accordance with at least some embodiments of the present invention.

FIG. 4 illustrates a neural network in accordance with at least some embodiments of the present invention. An input data item 410, such as, for example, an image, is provided to a first layer 420. First layer 420 comprises, in the illustrated example, three feature maps, of which only the first feature map comprises selected elements, denoted by marks "x" in the figure. These elements provide input to weak classifier 450.

Second layer 430 comprises, in the illustrated example, three feature maps, of which the first and last feature maps comprise selected elements, denoted by marks "x" in the figure. These elements provide inputs to weak classifiers 452 and 454, as illustrated. Neural networks may comprise more than two layers, and layers need not have exactly three feature maps.

In use, elements of the feature maps are generated in accordance with the labelling information, as described herein above. Feature maps that do not comprise selected elements and which are not needed in generating selected elements in subsequent layers need not be generated. Responsive to weak classifier 450 deciding, based on input it receives, that no object is present in the input data item, processing advances to branch "N" and the input data item is assigned the classification decision "no object" in phase 460. Otherwise, branch "Y" is selected and processing advances.

Provided weak classifier 450 does not arrive at the "no object" classification decision, the next feature maps are generated, in accordance with the labelling information, until weak classifier 452 is provided with its inputs. Here, responsive to weak classifier 452 deciding, based on the input it receives, that no object is present in the input data item, processing advances to branch "N" and the input data item is assigned the classification decision "no object" in phase 460. Otherwise, branch "Y" is selected and processing advances.

Once the last feature map of second layer 430 is generated, in elements identified in the labelling information, weak classifier 454 is provided its inputs. Responsive to weak classifier 454 deciding, based on input it receives, that no object is present in the input data item, processing advances to branch "N" and the input data item is assigned the classification decision "no object" in phase 460. Otherwise, branch "Y" is selected and processing advances to phase 470, where the input data item is assigned the classification decision "object detected", since none of the weak classifiers was able to reject the input data item.

A technical effect may be obtained in increased computational efficiency, as well as reduced need for memory as the feature maps are only partially generated. Since all elements that contribute to a classification decision may be generated, these advantages may, in at least some embodiments, be obtained with no degradation of classification performance.

Experimental results on the well-known Caltech pedestrian dataset demonstrate the advantages of the proposed method. The Caltech pedestrian dataset is available at vision.caltech.edu. To obtain the experimental results, VGG, as described by K. Simonyan and A. Zisserman, "Very deep convolutional networks for large-scale image recognition," CoRR, abs/1409.1556, 2015 is adopted as the CNN. The VGG network has 19 layers. The parameters are learned from training images of the Caltech pedestrian dataset. For a testing image of 640 480 pixels, there are 47335 candidate windows. One or more candidate windows contain pedestrian or pedestrians. Assume that only central processing unit, CPU, is used and no graphics processing unit, GPU, is available. The detection speed of the present method is 2.3 frames per second, fps, whereas the detection speed of CNN-LLD X. Jiang, "Object detection with neural network," PCT/CN2014/094033, 2014, is 0.09 fps and the detection speed of MCF J. Cao, Y. Pang, and X. Li, "Learning Multilayer Channel Features for Pedestrian Detection," arXiv preprint arXiv:1603.00124, is 0.54 fps. The superiority of the present method over existing methods is remarkable.

Figure 5:
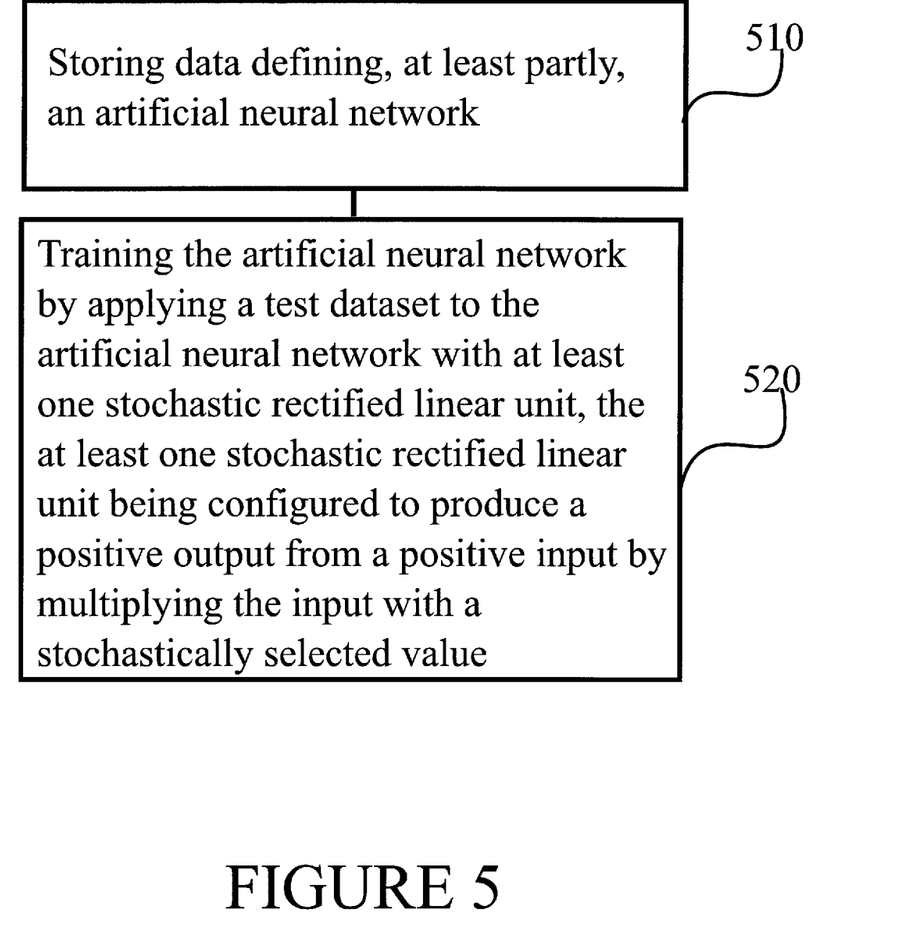
FIG. 5 is a flow graph of a method in accordance with at least some embodiments of the present invention.

FIG. 5 is a flow graph of a method in accordance with at least some embodiments of the present invention. The phases of the illustrated method may be performed in a device arranged to run the neural network, for example, by a control device of such a device.

Phase 510 comprises storing, at least partly, labelling information of a convolutional artificial neural network. Phase 520 comprises generating, from an input data item, partial feature maps of the convolutional artificial neural network in accordance with the labelling information. Finally, phase 530 comprises generating, from the partial feature maps, inputs to a plurality of weak classifiers to generate a classification decision. The labelling information may identify the following: elements of the feature maps that generate the inputs, and elements of the feature maps that are used to generate the elements that generate the inputs.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in optimizing machine recognition, to, for example, reduce traffic accidents in self-driving vehicles.

ACRONYMS

CNN convolutional neural network
CPU Central processing unit
fps frames per second
GPU Graphics processing unit
WiMAX Worldwide interoperability for microwave access
WLAN Wireless local area network

REFERENCE SIGNS LIST

| | |
|---|---|
| 110 | View |
| 101 | Road |
| 125 | Area of interest |
| 120 | Pedestrian |
| 130 | First layer |
| 140 | Second layer |
| 150 | Third layer |
| 300-360 | Structure of device of FIG. 3 |
| 410-430 | Layers of the neural network illustrated in FIG. 4 |
| 450, 452, 454 | Weak classifiers (FIG. 4) |
| 460 | Reject decision (FIG. 4) |
| 470 | Accept decision (FIG. 4) |
| 510-530 | Phases of the method of FIG. 5 |

What is claimed is:

1. An apparatus comprising:
memory configured to store, at least partly, labelling information of a convolutional artificial neural network, and
at least one processing core configured to:
generate, from an input data item, partial feature maps of the convolutional artificial neural network in accordance with the labelling information;
generate, from the partial feature maps, inputs to a plurality of weak classifiers to generate a classification decision,
wherein the labelling information identifies at least one of the following:
elements of the feature maps that generate the inputs, and
elements of the feature maps that are used to generate the elements that generate the inputs.

2. The apparatus according to claim 1, wherein the at least one processing core is configured to generate, in generating the partial feature maps, feature map elements identified by the labelling information and leave un-generated at least part of the feature map elements not identified by the labelling information.

3. The apparatus according to claim 1, wherein the at least one processing core is configured to generate, in generating the partial feature maps, feature map elements identified by the labelling information and leave un-generated all of the feature map elements not identified by the labelling information.

4. The apparatus according to claim 1, wherein the at least one processing core is configured to leave un-generated, in generating the partial feature maps, feature maps that do not comprise any elements identified by the labelling information.

5. The apparatus according to claim 1, wherein the input data item comprises at least one of an image, a video frame and an audio clip.

6. The apparatus according to claim 1, wherein the at least one processing core is configured to stop analysing the input data item responsive to the classification decision being taken by the plurality of weak classifiers based on partial generation of the partial feature maps.

7. The apparatus according to claim 1, wherein the at least one processing core is configured to generate a default classification decision responsive to the weak classifiers not reaching the classification decision based on the partial feature maps.

8. The apparatus according to claim 7, wherein the default classification decision comprises that an object is detected in the input data item.

9. The apparatus according to claim 1, wherein the convolutional artificial neural network comprises 19 layers.

10. The apparatus according to claim 1, wherein the convolutional artificial neural network is configured to use an entire input data item, the input data item comprising an image.

11. A method comprising:
storing, at least partly, labelling information of a convolutional artificial neural network;
generating, from an input data item, partial feature maps of the convolutional artificial neural network in accordance with the labelling information;
generating, from the partial feature maps, inputs to a plurality of weak classifiers to generate a classification decision,
wherein the labelling information identifies at least one of the following:
elements of the feature maps that generate the inputs, and
elements of the feature maps that are used to generate the elements that generate the inputs.

12. The method according to claim 11, wherein the method comprises generating, in generating the partial feature maps, feature map elements identified by the labelling information and leaving un-generated at least part of the feature map elements not identified by the labelling information.

13. The method according to claim 11, wherein the method comprises generating, in generating the partial feature maps, feature map elements identified by the labelling information and leaving un-generated all of the feature map elements not identified by the labelling information.

14. The method according to claim 11, wherein the method comprises leaving un-generated, in generating the partial feature maps, feature maps that do not comprise any elements identified by the labelling information.

15. The method according to claim 11, wherein the input data item comprises at least one of an image, a video frame and an audio clip.

16. The method according to claim 11, further comprising stopping analysing the input data item responsive to the classification decision being taken by the plurality of weak classifiers based on partial generation of the partial feature maps.

17. The method according to claim 11, further comprising generating a default classification decision responsive to the weak classifiers not reaching the classification decision based on the partial feature maps.

18. The method according to claim 17, wherein the default classification decision comprises that an object is detected in the input data item.

19. The method according to claim 11, wherein the convolutional artificial neural network comprises 19 layers.

20. A non-transitory computer readable medium having stored thereon a set of computer readable instructions that, when executed by at least one processor, cause an apparatus to at least:
- store, at least partly, labelling information of a convolutional artificial neural network;
- generate, from an input data item, partial feature maps of the convolutional artificial neural network in accordance with the labelling information;
- generate, from the partial feature maps, inputs to a plurality of weak classifiers to generate a classification decision,
- wherein the labelling information identifies at least one of the following:
  - elements of the feature maps that generate the inputs, and
  - elements of the feature maps that are used to generate the elements that generate the inputs.

* * * * *